United States Patent
Onodera

(10) Patent No.: US 10,865,902 B2
(45) Date of Patent: Dec. 15, 2020

(54) FLOW-RATE CONTROL VALVE

(71) Applicant: DENSO CORPORATION, Kariya (JP)

(72) Inventor: Hirofumi Onodera, Kariya (JP)

(73) Assignee: DENSO CORPORATION, Kariya (JP)

(*) Notice: Subject to any disclaimer, the term of this patent is extended or adjusted under 35 U.S.C. 154(b) by 79 days.

(21) Appl. No.: 16/264,847

(22) Filed: Feb. 1, 2019

(65) Prior Publication Data

US 2019/0277417 A1 Sep. 12, 2019

(30) Foreign Application Priority Data

Mar. 6, 2018 (JP) ................. 2018-039464

(51) Int. Cl.
*F16K 17/26* (2006.01)
*G05D 7/01* (2006.01)

(52) U.S. Cl.
CPC ........... *F16K 17/26* (2013.01); *G05D 7/0133* (2013.01)

(58) Field of Classification Search
CPC ....... F02M 25/0836; F16K 17/26; F16K 1/36; F16K 31/047; F16K 31/508; G05D 7/0126; G05D 7/0133; F16F 1/041; F16F 1/047; F16F 1/048
See application file for complete search history.

(56) References Cited

U.S. PATENT DOCUMENTS

| | | | | |
|---|---|---|---|---|
| 4,273,307 A * | 6/1981 | Malinski | ............... | F16K 31/047 185/40 R |
| 5,390,703 A * | 2/1995 | Tengesdal | ................. | F16K 1/44 137/629 |
| 6,612,338 B2 * | 9/2003 | Weldon | ..................... | F16K 1/44 137/529 |
| 7,114,518 B2 * | 10/2006 | Kirby | ..................... | F16K 17/26 137/504 |
| 7,287,546 B2 * | 10/2007 | Konishi | ............. | F02M 37/0029 123/511 |
| 9,470,161 B2 * | 10/2016 | Akita | .................... | F02D 41/003 |
| 2015/0068568 A1 * | 3/2015 | Wu | ........................... | F16F 3/04 135/22 |
| 2015/0159566 A1 * | 6/2015 | Akita | .................. | F02D 41/1402 137/488 |
| 2015/0159567 A1 * | 6/2015 | Akita | .................. | F02D 41/1402 137/624.27 |
| 2016/0146159 A1 * | 5/2016 | Kimoto | ............. | F02M 25/0836 123/520 |

(Continued)

*Primary Examiner* — Carl C Staubach

(74) *Attorney, Agent, or Firm* — Nixon & Vanderhye PC

(57) ABSTRACT

A valve unit is moveably accommodated in a valve housing having a valve seat. A coil spring is provided at an outer periphery of the valve unit to bias the valve unit in an axial direction of absorbing a backlash between a driving-side screw portion of a driving portion and a valve-side screw portion of the valve unit. Pressure losses of fluid at respective portions are so made to satisfy a relationship of "P0≥P1≥P2", wherein "P0" is a pressure loss of the fluid passing through an outlet port, "P1" is a pressure loss of the fluid passing through an axial space formed between the valve unit and the valve seat in a condition that the valve unit is most separated from the valve seat, and "P2" is a pressure loss of the fluid passing through an axial gap formed between neighboring spring wire portions or passing through an axial gap formed between the coil spring and the valve seat.

11 Claims, 11 Drawing Sheets

(56) References Cited

U.S. PATENT DOCUMENTS

2017/0335914 A1* 11/2017 Thomas ................ A47C 27/064
2018/0291851 A1* 10/2018 Filippi ................. F02M 51/066
2019/0353274 A1* 11/2019 Onodera ............... F16K 31/047

* cited by examiner

FLOW-RATE CONTROL VALVE

CROSS REFERENCE TO RELATED APPLICATION

This application is based on Japanese Patent Application No. 2018-39464 filed on Mar. 6, 2018, the disclosure of which is incorporated herein by reference.

FIELD OF TECHNOLOGY

The present disclosure relates to a flow-rate control valve.

BACKGROUND

A vaporized fuel processing apparatus of a prior art includes a canister for absorbing or discharging fuel vapor, which is generated in a fuel tank mounted in an automotive vehicle, and a fuel vapor passage for communicating the fuel tank to the canister. For example, in one of the vaporized fuel processing apparatuses, a flow-rate control valve is provided in the fuel vapor passage. The flow-rate control valve closes the fuel vapor passage during the automotive vehicle is parking, while it opens the fuel vapor passage when fuel (gasoline) is filled into the fuel tank.

SUMMARY OF THE DISCLOSURE

According to a feature of the present disclosure, a flow-rate control valve includes a valve housing, a valve unit, a driving portion, a driving-side screw portion, a valve-side screw portion, a coil spring and so on.

The coil spring is provided in a fluid flow path of a connecting space formed in the valve housing and biases the valve unit in an axial direction for absorbing a backlash between the driving-side screw portion and the valve-side screw portion.

In the flow-rate control valve, pressure losses of the fluid at respective portions are so made as to satisfy a relationship of "P0≥P1≥P2", wherein "P0" is a pressure loss of the fluid passing through a vaporized-fuel outlet port, "P1" is a pressure loss of the fluid passing through an axial space formed between the valve unit and a valve seat (35) of the valve housing in a condition that the valve unit is separated from the valve seat, and "P2" is a pressure loss of the fluid passing through an axial gap formed between neighboring spring wire portions of the coil spring or passing through an axial gap formed between the coil spring and the valve seat.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
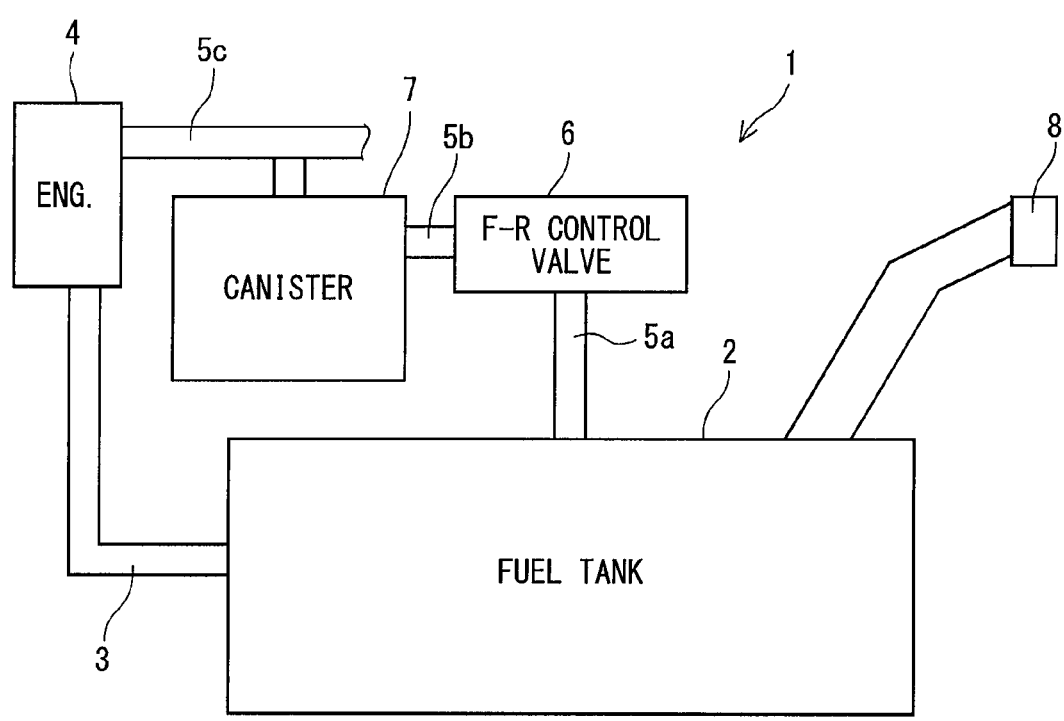
FIG. 1 is a schematic view showing an outline of a vaporized fuel processing system.

FIG. 1 is a schematic view showing an outline of a vaporized fuel processing system 1. Fuel is supplied from a fuel tank 2 to an internal combustion engine 4 (hereinafter, the engine 4) via a fuel supply passage 3. Vaporized fuel, which is fuel vaporized in the fuel tank 2, flows to a canister 7 through a first fuel vapor passage 5a, a flow-rate control valve 6, and a second fuel vapor passage 5b. The vaporized fuel is then absorbed in absorbent material (for example, activated carbon) filled in the canister 7. The vaporized fuel is discharged from the canister 7 into the engine 4 through a third fuel vapor passage 5c, at a predetermined timing by use of negative pressure of the engine 4.

The flow-rate control valve 6 maintains its valve closed condition during an automotive vehicle is parked. The vaporized fuel, which is vaporized in the fuel tank 2, does not flow to the canister 7. When a tank filler cap 8 is removed to open a fuel filling passage, the flow-rate control valve 6 is opened and its valve opened condition is maintained during a period from a start of a fuel filling operation to an end of the fuel filling operation. Therefore, when filling the fuel into the fuel tank 2, the vaporized fuel in the fuel tank 2 flows to the canister 7 through the first fuel vapor passage 5a, the flow-rate control valve 6 and the second fuel vapor passage 5b, so that the vaporized fuel is absorbed in the absorbent material of the canister 7. As above, the flow-rate control valve 6 controls communication between the fuel tank 2 and the canister 7.

Multiple embodiments for the flow-rate control valve 6 of FIG. 1 will be explained hereinafter with reference to the drawings. The same reference numerals are given to the same or similar structure and/or portions in order to avoid repeated explanation. In each of FIGS. 2, 3, 5, 6, 7, 9 and 11, an arrow with a curved line indicates an example of a fluid flow path of the vaporized fuel.

First Embodiment

Figure 2:
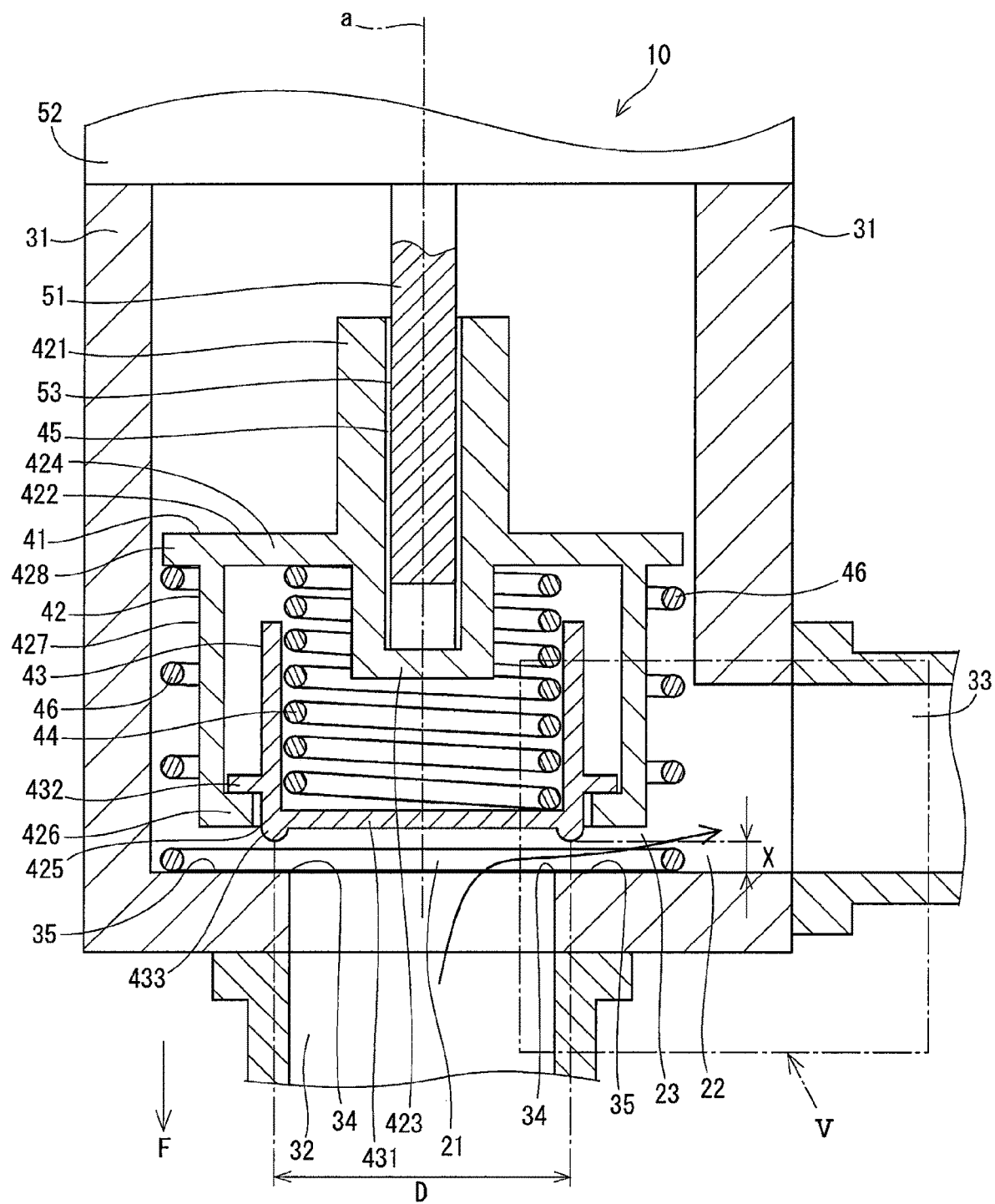
FIG. 2 is a schematic cross-sectional view showing a flow-rate control valve according to a first embodiment of the present disclosure, wherein the flow-rate control valve is in a valve opened condition.
Figure 3:
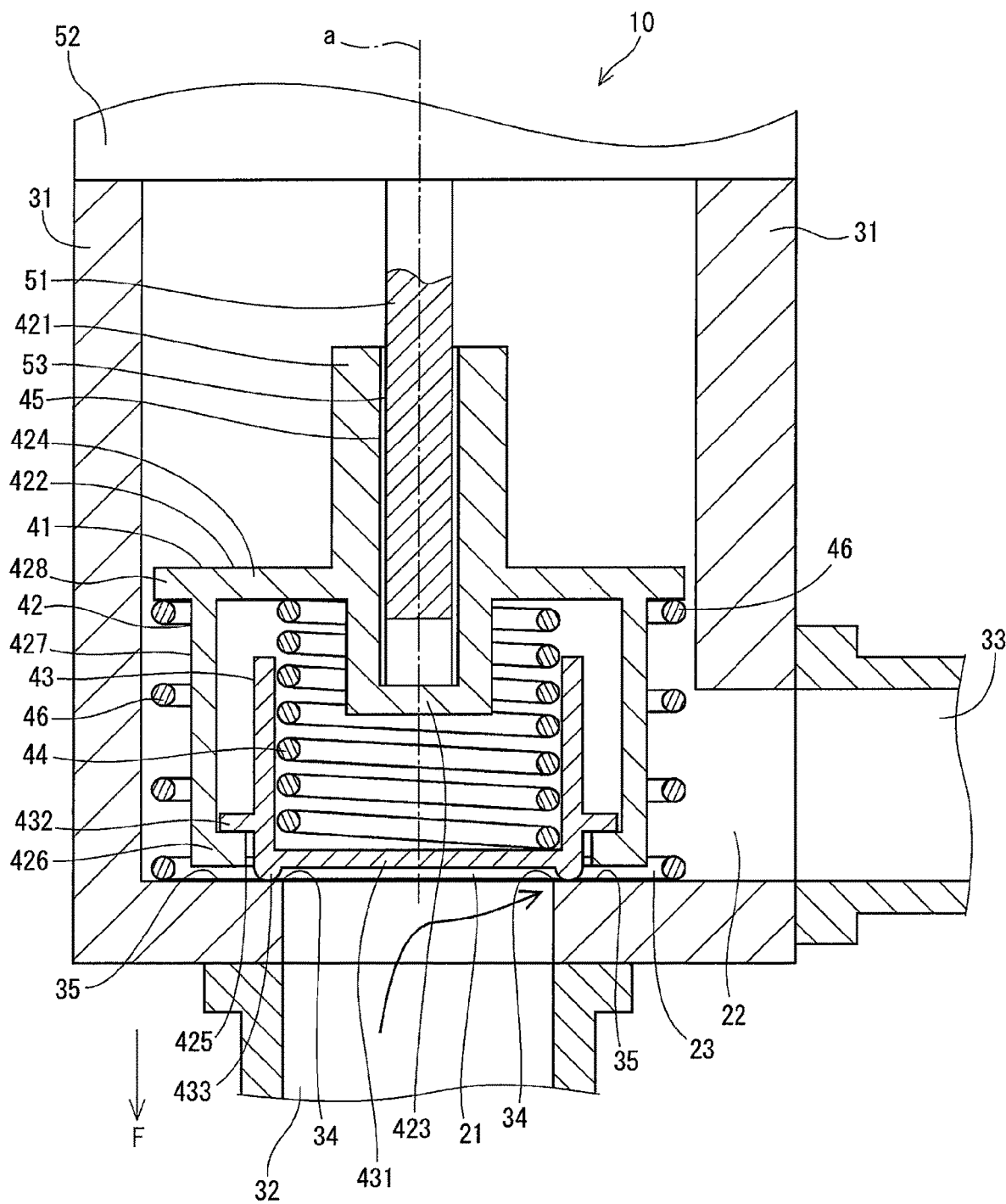
FIG. 3 is a schematic cross-sectional view showing the flow-rate control valve according to the first embodiment of the present disclosure, wherein the flow-rate control valve is in a valve closed condition.

FIG. 2 is a schematic cross-sectional view showing a flow-rate control valve 10 according to a first embodiment of the present disclosure, for example, which is used as the flow-rate control valve 6 of FIG. 1. The flow-rate control valve 10 of FIG. 2 is in its valve opened condition. On the other hand, FIG. 3 is a schematic cross-sectional view showing the flow-rate control valve 10 of the first embodiment, wherein the flow-rate control valve 10 is in its valve closed condition. A direction F in the drawings corresponds to an axial direction of the flow-rate control valve 10 and a direction to the fuel tank 2.

The flow-rate control valve 10 has a valve housing 31. The valve housing 31 forms therein the fluid flow path, in which the vaporized fuel flows from a first fluid passage 21 formed on a side of a vaporized-fuel inlet port 32 to a second fluid passage 22 connected to a vaporized-fuel outlet port 33. The valve housing 31 forms a connecting space 23 for communicating the first fluid passage 21 to the second fluid passage 22. The first fluid passage 21 corresponds to a space formed in the valve housing 31, which is located at a position axially closer to the vaporized-fuel inlet port 32 than a sealing portion 433 (explained below). The second fluid passage 22 corresponds to a space formed in the valve housing 31, which is located at a position radially closer to the vaporized-fuel outlet port 33 than a second coil spring 46 (explained below).

The valve housing 31 is formed in a cylindrical shape having the vaporized-fuel inlet port 32 and the vaporized-fuel outlet port 33. The vaporized-fuel inlet port 32 is connected to the fuel tank 2, while the vaporized-fuel outlet port 33 is connected to the canister 7. The second fluid passage 22 is connected to the vaporized-fuel outlet port 33. A flat surface portion, which extends from an inner periphery 34 of the vaporized-fuel inlet port 32 in a radial outward direction (perpendicular to the axial direction F), forms a valve seat 35.

The flow-rate control valve 10 includes a valve unit 41, which is movably accommodated in the valve housing 31 and operatively brought into contact with the valve seat 35 or separated from the valve seat 35, so that the fluid flow path is closed to block off the fluid flow through the connecting space 23 or the fluid flow path is opened to allow the fluid flow through the connecting space 23. In each of the drawings of FIGS. 2, 5, 6, 7, 9 and 11, the valve unit 41 is located at a position, which is most separated from the valve seat 35.

The valve unit 41 includes a valve holding member 42 and a valve body member 43. The valve holding member 42 includes a small-diameter cylindrical portion 421 having a bottom portion 423 and a large-diameter cylindrical portion 422 having a bottom portion 424. Each of the small-diameter cylindrical portion 421 and the large-diameter cylindrical portion 422 has a common center axis "a", so that the small-diameter and the large-diameter cylindrical portions 421 and 422 are coaxially arranged with each other. The common center axis "a" is also a center axis of the vaporized-fuel inlet port 32, which is also formed in the cylindrical shape. The bottom portion 423 of the small-diameter cylindrical portion 421 is located at an axial lower-side position (on a side closer to the vaporized-fuel inlet port 32 in the axial direction F). The bottom portion 424 of the large-diameter cylindrical portion 422 is located at an axial upper-side position (on an opposite side to the vaporized-fuel inlet port 32 in the axial direction F). The bottom portion 423 of the small-diameter cylindrical portion 421 is located at a position, which is axially closer to the vaporized-fuel inlet port 32 in the axial direction F than the bottom portion 424 of the large-diameter cylindrical portion 422. In other words, the bottom portion 423 of the small-diameter cylindrical portion 421 is axially projected in the direction to the vaporized-fuel inlet port 32 from the bottom portion 424 of the large-diameter cylindrical portion 422.

The valve body member 43 is formed in a cylindrical shape having a bottom portion 431, which is formed at an axial lower side of the valve body member 43 in the axial direction F. A center axis of the valve body member 43 coincides with the center axis "a" of the small-diameter and the large-diameter cylindrical portions 421 and 422. A first coil spring 44 is arranged inside of the valve body member 43 between the bottom portion 431 of the valve body member 43 and the bottom portion 424 of the large-diameter cylindrical portion 422 so as to bias each of the bottom portions 431 and 424 away from each other in the axial direction F.

A flanged portion 432 extending in the radial outward direction is formed at an outer peripheral surface of the valve body member 43 in an axially vicinity of the bottom portion 431. An opening portion 425 is formed at an axial lower-side end of the large-diameter cylindrical portion 422, which is located on an axially opposite side to the bottom portion 424. A stopper portion 426 extending in a radial inward direction is formed at the opening portion 425. The flanged portion 432 of the valve body member 43 is axially engaged with the stopper portion 426 of the large-diameter cylindrical portion 422. A biasing force of the first coil spring 44 is received by an engagement between the flanged portion 432 and the stopper portion 426.

The valve unit 41 is movable in the axial direction F. More exactly, the valve unit 41 is driven by a driving portion 51 to move in the axial direction F to the valve seat 35 or in the opposite direction away from the valve seat 35. The driving portion 51 is rotated by a stepping motor 52. A driving-side screw portion 53 is formed in the driving portion 51. A valve-side screw portion 45 is formed in the valve unit 41 (the small-diameter cylindrical portion 421), so that the driving-side screw portion 53 is screw engaged with the valve-side screw portion 45.

When the driving portion 51 is rotated in a predetermined direction in the condition that the driving-side screw portion 53 and the valve-side screw portion 45 are engaged with each other, the valve holding member 42 is moved in the axial direction closer to the valve seat 35 or in the axial opposite direction away from the valve seat 35. The valve body member 43 is thereby reciprocated in the axial direction in accordance with the axial movement of the valve holding member 42. When the valve unit 41 is brought into contact with the valve seat 35, the sealing portion 433 formed in an annular shape at the bottom portion 431 of the valve body member 43 is in contact with the valve seat 35 to thereby block off the connecting space 23. The vaporized fuel is thereby not allowed to pass through the connecting space 23. The valve opened condition of the flow-rate control valve 10 shown in FIG. 2 is changed to the valve closed condition of FIG. 3. The valve closed condition is operatively changed to the valve opened condition. The first coil spring 44 as well as the second coil spring 46 is operatively expanded or compressed.

The flow-rate control valve 10 includes the second coil spring 46, which is arranged in the connecting space 23 on a side closer to the second fluid passage 22. The second coil spring 46 biases the valve unit 41 in the axial direction to absorb a backlash between the driving-side screw portion 53 and the valve-side screw portion 45.

The second coil spring 46 is provided at an outer peripheral surface 427 of the valve holding member 42. A flanged portion 428 is so formed as to extend in the radial outward direction from the bottom portion 424 of the large-diameter cylindrical portion 422. The second coil spring 46 is provided between the flanged portion 428 and the valve seat 35 to bias each of them in the axial direction away from each other. The biasing force of the second coil spring 46, which is applied to the flanged portion 428, absorbs the backlash between the driving-side screw portion 53 and the valve-side screw portion 45.

A pressure loss, which is generated in the fluid (the vaporized fuel) passing through the vaporized-fuel outlet port 33, is designated by "P0". A pressure loss, which is generated in the fluid (the vaporized fuel) passing through the connecting space 23 (more exactly, in an axial space between the valve unit 41 and the valve seat 35) in the condition that the valve unit 41 is separated from the valve seat 35, is designated by "P1". A pressure loss, which is generated in the fluid (the vaporized fuel) passing through an axial gap between neighboring spring wire portions of the second coil spring 46 or passing through an axial gap between the second coil spring 46 and the valve seat 35, is designated by "P2". Then, the following relationship is satisfied among those pressure losses in the present embodiment:

$$P0 \geq P1 \geq P2$$

In addition, a cross-sectional area of the vaporized-fuel outlet port 33 is designated by "S0". A cross-sectional area of the axial space between the valve unit 41 and the valve seat 35 in the condition that the valve unit 41 is separated from the valve seat 35 is designated by "S1". A total of a cross-sectional area of the axial gap between the neighboring spring wire portions of the second coil spring 46 and a cross-sectional area of the axial gap between the second coil spring 46 and the valve seat 35 is designated by "S2". Then, the following relationship is satisfied among those cross-sectional areas in the present embodiment:

$$S0 \leq S1 \leq S2$$

The cross-sectional area in the present disclosure means an area on a cross section of the fluid flow perpendicular to a direction of the fluid flow, through which the fluid flows.

The cross-sectional area "S1" is calculated in the following way. A diameter "D" of the sealing portion 433 of the annular shape (shown in FIG. 2) is multiplied by "$\pi$", so as to obtain a circumferential distance of a circular formed by the sealing portion 433. Then, the circumferential distance of "D×$\pi$" is further multiplied by an axial distance "X", which is an axial distance between the sealing portion 433 and the valve seat 35. Namely, the cross-sectional area "S1" corresponds to an outer peripheral surface area of a columnar form (a first columnar form), which has a circumferential distance (D×$\pi$) of the circle surrounded by the sealing portion 433 and a height equal to the axial distance "X".

The cross-sectional area "S2" corresponds to a part of an outer peripheral surface area of a columnar form (a second columnar form), which has a circumferential distance of a circle surrounded by the second coil spring 46 and a height (equal to the axial gap between the neighboring spring wire portions), wherein the fluid (vaporized fuel) passes through the part of the outer peripheral surface area of the second columnar form.

The cross-sectional area "S0" corresponds to a cross-sectional area of the vaporized-fuel outlet port 33.

Figure 4:
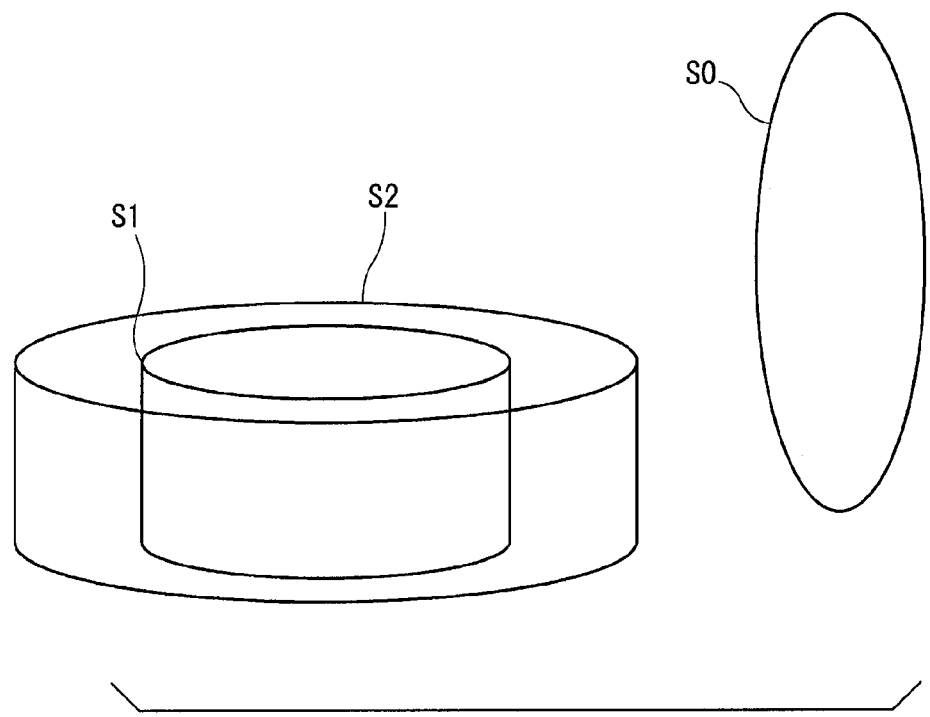
FIG. 4 is a schematic view showing respective cross-sectional areas S0, S1 and S2 in corresponding portions of the flow-rate control valve.

Each of the cross-sectional areas "S0", "S1" and "S2" is schematically shown in FIG. 4. As explained above and shown in FIG. 4, the cross-sectional area "S1" is the outer peripheral surface area of the first columnar form. The cross-sectional area "S2" is the part of the outer peripheral surface area of the second columnar form, which is formed at an outer side of the first columnar form. The cross-sectional area "S0" is located at a position separated from the cross-sectional areas "S1" and "S2".

When the relationship of "S0≤S1≤S2" is satisfied, each of the pressure losses (P1 and P2) of the vaporized fuel at each of the positions of the cross-sectional areas "S1" and "S2" becomes smaller than the pressure loss (P0) at the portion of the cross-sectional area "S0". In a case that the pressure loss of the vaporized fuel is increased in the flow-rate control valve 10, it is necessary to increase a valve opening amount in order to obtain a predetermined flow rate of the vaporized fuel. Then, it causes an increase of the electric power consumption. In other words, the increase of the electric power consumption can be avoided, when the relationship of "S0≤S1≤S2" is satisfied. Namely, the increase of the electric power consumption can be avoided, when the relationship of "P0≥P1≥P2" is satisfied.

It is necessary for the second coil spring 46 to have such a shape which does not prevent a smooth flow of the vaporized fuel, when the relationship of "P0≥P1≥P2" and/or the relationship of "S0≤S1≤S2" is satisfied. In the present embodiment, an axial distance between the neighboring spring wire portions of the second coil spring 46 is made to be uniform for its entire length. In addition, the axial distance between the neighboring spring wire portions is made to be sufficiently large. Since each of the relationships of "P0≥P1≥P2" and "S0 S1 S2" is satisfied, the vaporized fuel can smoothly flow through the flow-rate control valve 10.

Figure 5:
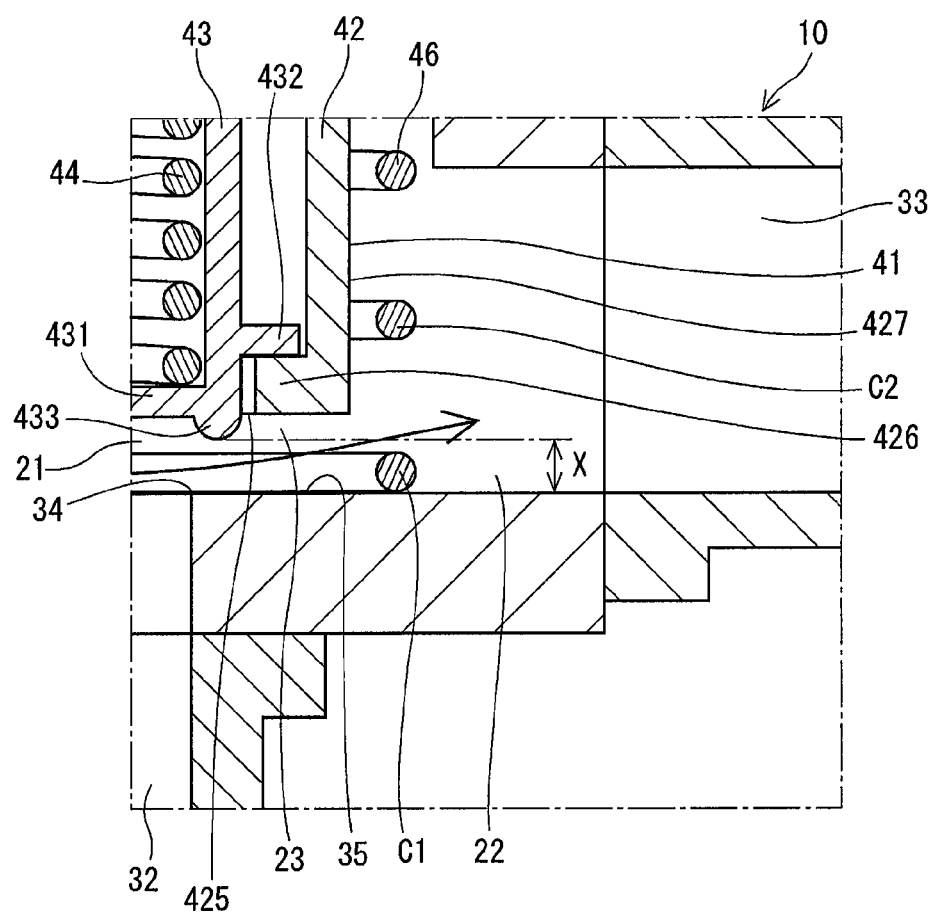
FIG. 5 is a schematically enlarged cross-sectional view showing a portion V of the flow-rate control valve, which is indicated in FIG. 2.

FIG. 5 is a schematically enlarged cross-sectional view showing a portion V of the flow-rate control valve 10 shown in FIG. 2. In the present embodiment, most of the vaporized fuel passes through the axial gap between a spring wire portion C1 and a neighboring spring wire portion C2 of the second coil spring 46, when the flow-rate control valve 10 is in the valve opened condition. As shown in FIG. 4, since the cross-sectional area "S2" is the part of the outer peripheral surface area of the second columnar form, which is located at the outer side of the first columnar form for the cross-sectional area "S1", the cross-sectional area "S2" is larger than the cross-sectional area "S1". In addition, the axial distance between the spring wire portions C1 and C2 is larger than the axial distance "X". In other words, each of the relationships of "S1≤S2" and "P1≥P2" is satisfied. When the cross-sectional area "S0" of the vaporized-fuel outlet port 33 is properly decided, each of the relationships of "P0≥P1≥P2" and "S0≤S1≤S2" can be satisfied.

(Flow-Rate Control Valve of a Prior Art)

Figure 6:
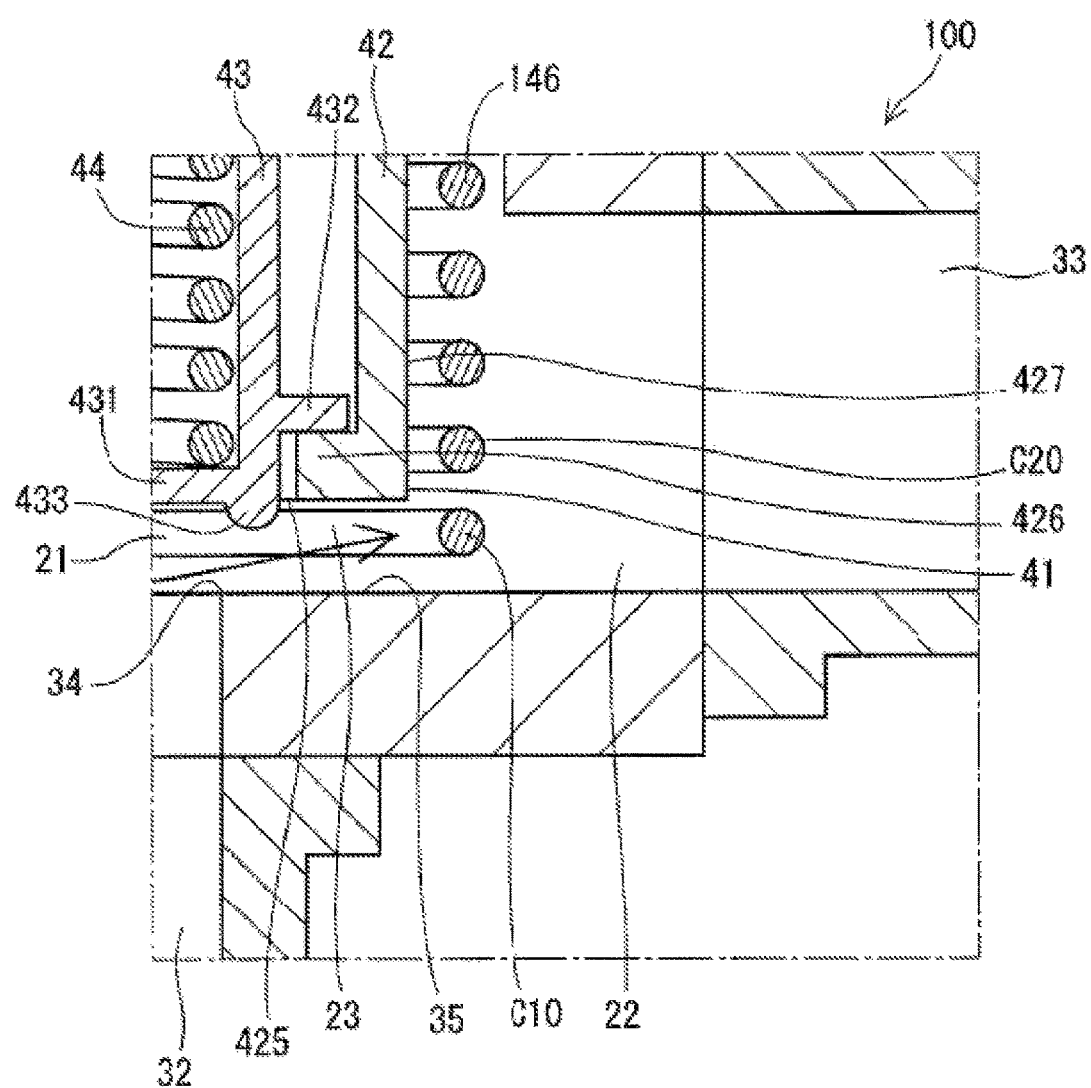
FIG. 6 is a schematically enlarged cross-sectional view showing a portion of a flow-rate control valve according to a prior art, wherein the portion of FIG. 6 corresponds to the portion of FIG. 5.

FIG. 6 shows relevant portions of a flow-rate control valve 100 according to one of the prior arts, for the purpose of comparing the above flow-rate control valve 10 of the first embodiment with the flow-rate control valve 100 of the prior art. The flow-rate control valve 100 of the prior art differs from the flow-rate control valve 10 of the first embodiment in a shape of a second coil spring 146. An axial distance between neighboring spring wire portions of the second coil spring 146 is smaller than that of the second coil spring 46 of the first embodiment. In addition, a spring wire portion C10 is located at such a position of the fluid flow, at which the spring wire portion C10 may prevent smooth flow of the vaporized fuel. Therefore, the pressure loss of the vaporized fuel at such a position becomes larger. In the flow-rate control valve 100, the vaporized fuel mainly passes through an axial gap between the spring wire portion C10 and the valve seat 35 and only partly passes through an axial gap between the spring wire portion C10 and a neighboring spring wire portion C20.

A pressure loss of the fluid (the vaporized fuel) passing through the vaporized-fuel outlet port 33 is defined as "P10". A pressure loss of the fluid (the vaporized fuel) passing through the axial space between the valve unit 41 and the valve seat 35 in the condition that the valve unit 41 is separated from the valve seat 35 is defined as "P11". A pressure loss of the fluid (the vaporized fuel) passing through the axial gap between the neighboring spring wire portions of the second coil spring 146 or passing through the axial gap between the second coil spring 146 and the valve seat 35 is defined as "P12". Then, a relationship of "P12≥P10≥P11" is satisfied. In other words, in the structure of the prior art, the pressure loss "P12" of the fluid passing through the axial gap between the neighboring spring wire portions and through the axial gap between the second coil spring 146 and the valve seat 35 becomes the largest among those pressure losses.

A cross-sectional area of the vaporized-fuel outlet port 33 is defined as "S10". A cross-sectional area of the axial space between the valve unit 41 and the valve seat 35 in the condition that the valve unit 41 is separated from the valve seat 35 is defined as "S11". A total cross-sectional area of the axial gap between the neighboring spring wire portions of the second coil spring 146 and the axial gap between the second coil spring 146 and the valve seat 35 is defined as "S12". Then, a relationship of "S12 S10 S11" is satisfied. Namely, in the structure or of the prior art, the cross-sectional area "S12" becomes the smallest among those cross-sectional areas.

In the flow-rate control valve of the above prior art, a fuel passage area may become occasionally smaller for any reason. In a case that the fuel passage area becomes smaller, an automatic stop function may be activated when the fuel vapor passage is going to be opened during a process of filling the fuel into the fuel tank. Then, it may become impossible to fill the fuel into the fuel tank.

However, in the flow-rate control valve of the present embodiment, since it is possible to avoid a situation that the axial space formed between the valve unit and the valve seat becomes smaller, the pressure loss of the vaporized fuel can be decreased. Since a valve opening amount can be made smaller in the flow-rate control valve of the present embodiment, it is possible to improve controllability of the flow-rate control valve and electric power consumption can be reduced.

Second Embodiment

Figure 7:
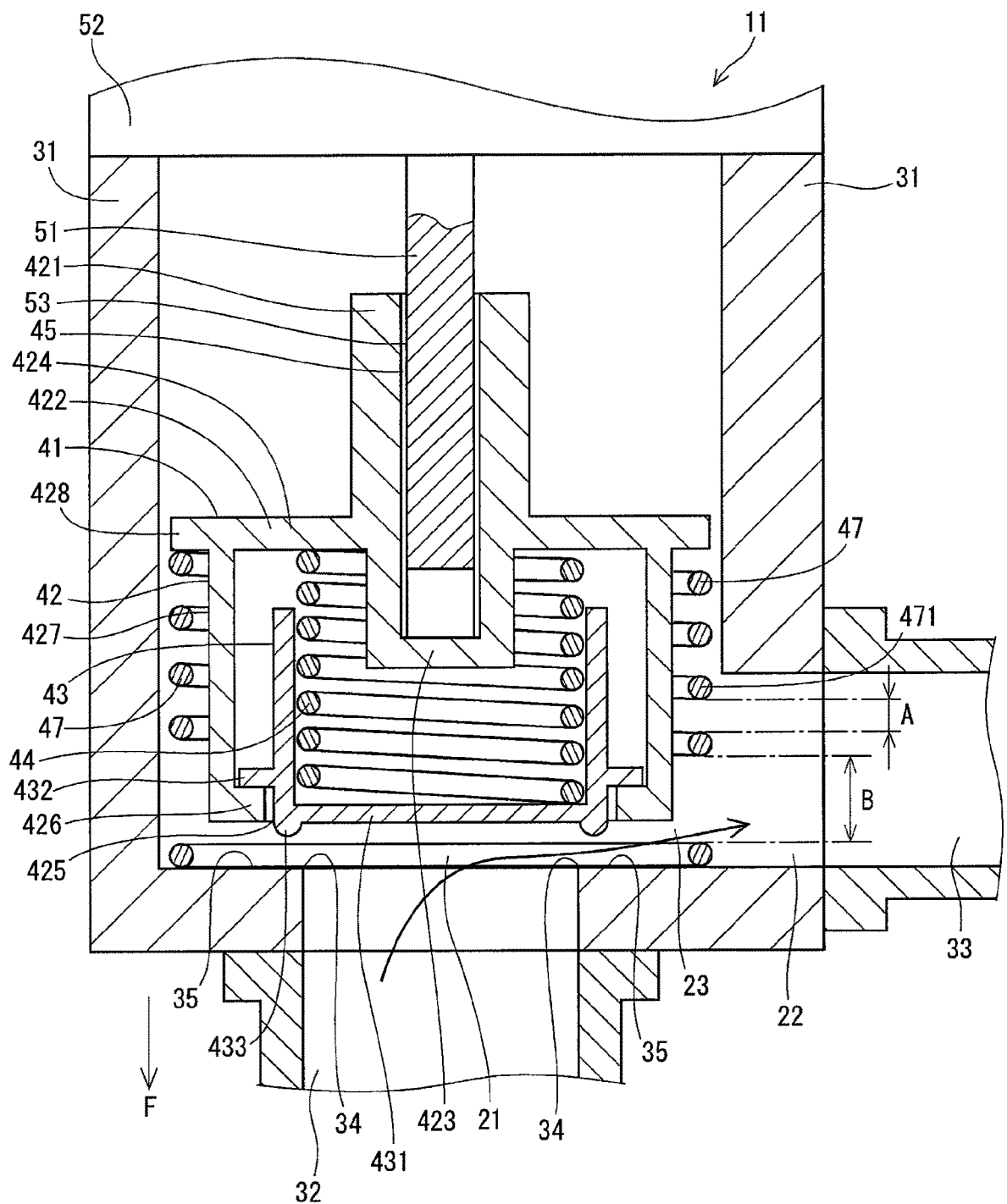
FIG. 7 is a schematic cross-sectional view showing a flow-rate control valve according to a second embodiment of the present disclosure.

A flow-rate control valve 11 according to a second embodiment, which is used as the flow-rate control valve 6 of FIG. 1, will be explained with reference to FIGS. 7 and 8. The flow-rate control valve 11 of the second embodiment differs from the flow-rate control valve 10 of the first embodiment in a shape of a second coil spring 47. FIG. 7 is a schematic cross-sectional view showing the flow-rate control valve 11 according to the second embodiment.

In the second coil spring 47, an axial distance between neighboring spring wire portions on a side closer to the valve seat 35 is larger than the axial distance between the valve unit 41 and the valve seat 35, when the valve unit 41 is separated from the valve seat at its maximum distance. In other words, the axial distance between the neighboring spring wire portions of the second coil spring 47 on the side closer to the valve seat 35 (a first coil portion of the second coil spring 47 between a lower end and a middle point 471) is larger than that on s side closer to the flanged portion 428 (a second coil portion of the second coil spring 47 between an upper end and the middle point 471).

Figure 8:
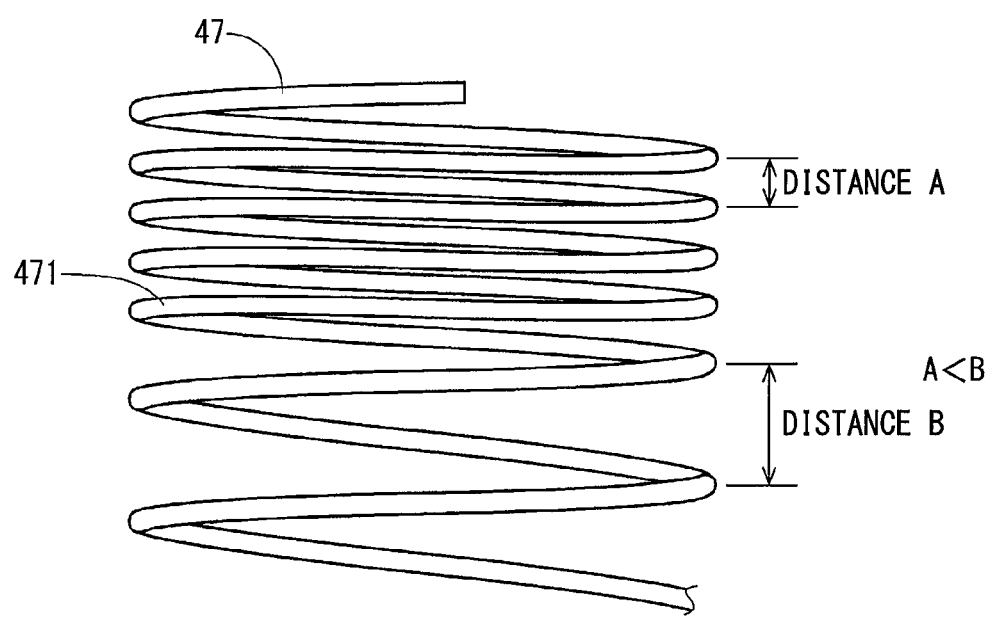
FIG. 8 is a schematically enlarged side view showing a second coil spring of the second embodiment.

As shown in FIG. 8, the axial distance A between the neighboring spring wire portions of the second coil portion of the second coil spring 47 is smaller than the axial distance B between the neighboring spring wire portions of the first coil portion of the second coil spring 47.

Since the axial distance B of the first coil portion of the second coil spring 47 is sufficiently large in the flow-rate control valve 11 of the second embodiment, each of the relationships of "P0≥P1≥P2" and "S0≤S1≤S2" is satisfied in the same manner to the first embodiment. In the flow-rate control valve 11 of the second embodiment, the pressure loss of the vaporized fuel is made smaller and thereby the increase of the electric power consumption is prevented, in the same manner to the first embodiment.

Third Embodiment

Figure 9:
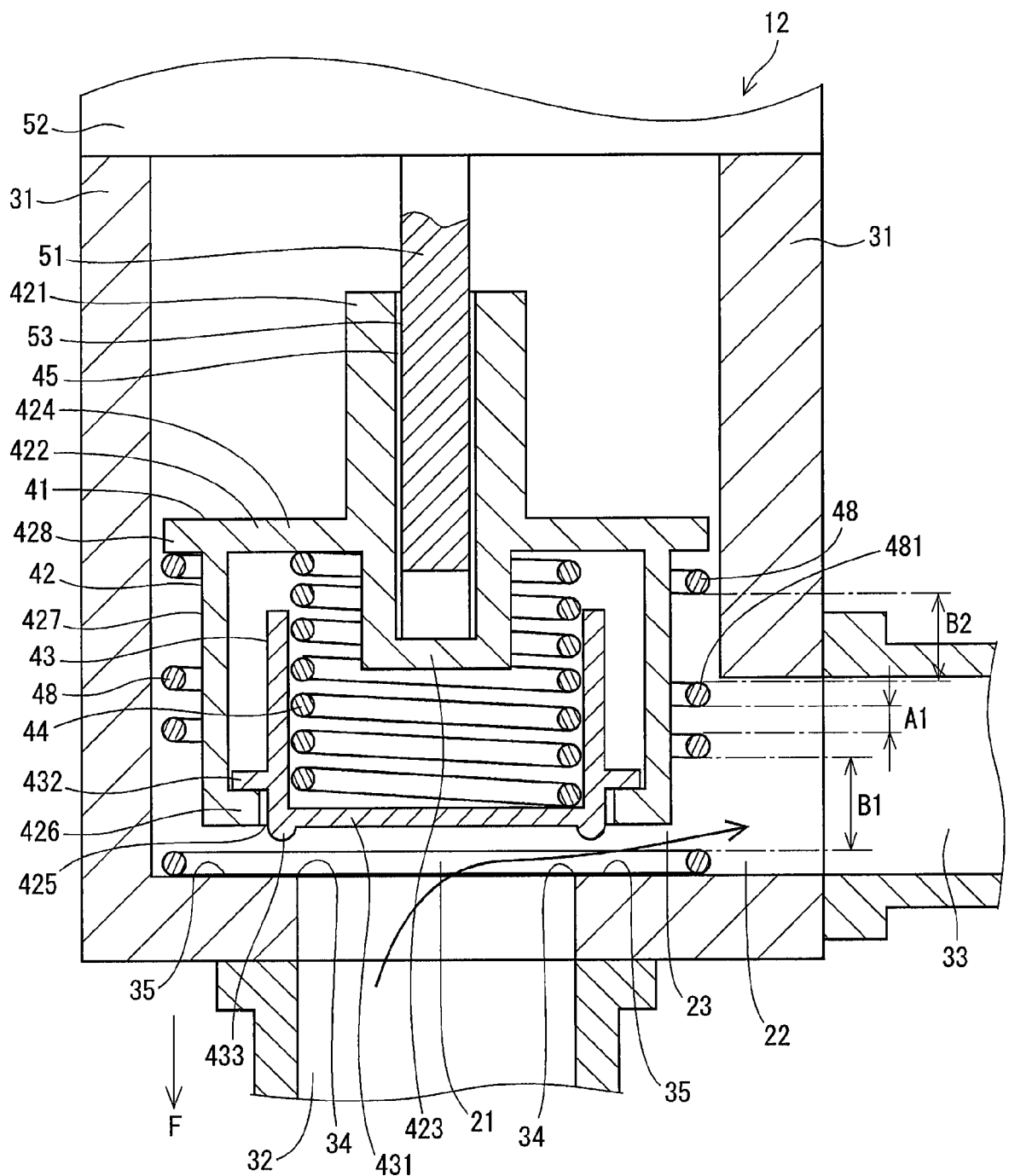
FIG. 9 is a schematic cross-sectional view showing a flow-rate control valve according to a third embodiment of the present disclosure.
Figure 10:
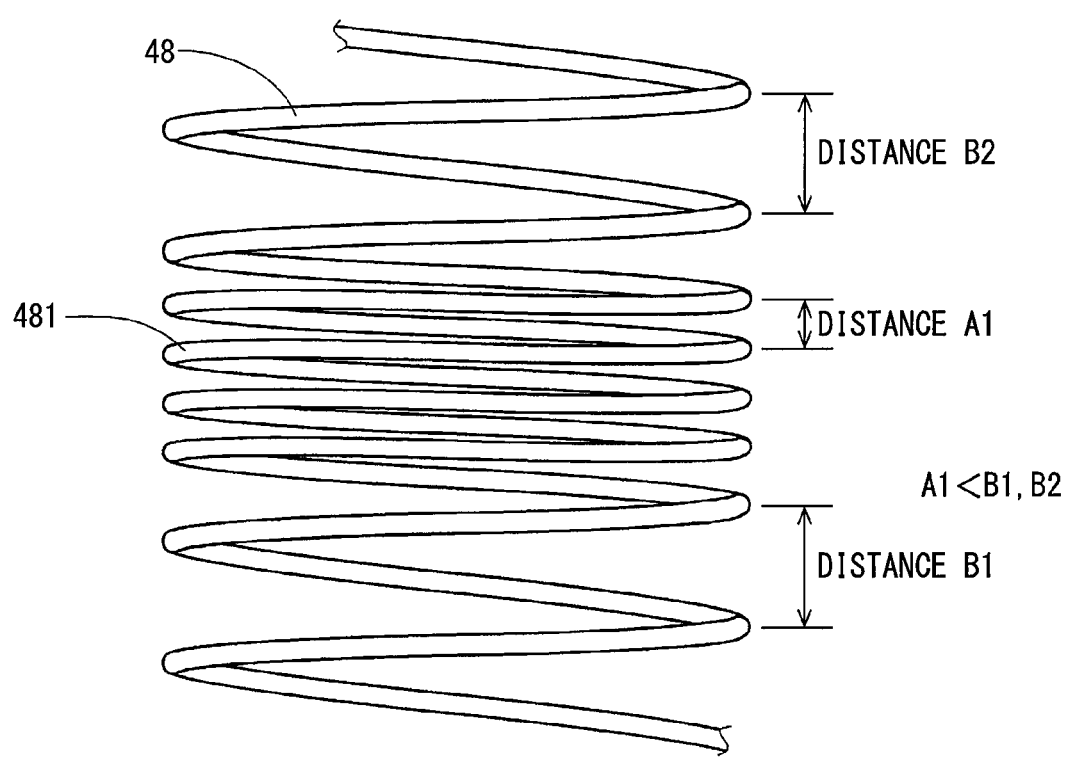
FIG. 10 is a schematically enlarged side view showing a second coil spring of the third embodiment.

A flow-rate control valve 12 according to a third embodiment, which is used as the flow-rate control valve 6 of FIG. 1, will be explained with reference to FIGS. 9 and 10. The flow-rate control valve 12 of the third embodiment differs from the flow-rate control valve 10 of the first embodiment in a shape of a second coil spring 48. FIG. 9 is a schematic cross-sectional view showing the flow-rate control valve 12 according to the third embodiment.

In the second coil spring 48, the axial distance between neighboring spring wire portions on the side closer to the valve seat 35 is larger than the axial distance between the valve unit 41 and the valve seat 35, when the valve unit 41 is separated from the valve seat 35 at its maximum distance. In addition, the axial distance between neighboring spring wire portions on the side closer to the flanged portion 428 is larger than the axial distance between the valve unit 41 and the valve seat 35, when the valve unit 41 is most separated from the valve seat 35. In other words, the axial distance between the neighboring spring wire portions of a first coil portion of the second coil spring 48 (that is, a coil portion between a lower end and a middle coil portion 481) as well as the axial distance between the neighboring spring wire portions of a third coil portion of the second coil spring 48 (that is, a coil portion between au upper end and the middle coil portion 481) is larger than the axial distance between the neighboring spring wire portions of the middle coil portion 481 (that is, a second coil portion of the second coil spring 48).

In the second coil spring 48, the axial distance A1 between the neighboring spring wire portions of the middle coil portion 481 (the second coil portion) is smaller than the axial distance B1 between the neighboring spring wire portions of the first coil portion of the second coil spring 48. In addition, the axial distance A1 of the second coil portion is smaller than the axial distance B2 between the neighboring spring wire portions of the third coil portion of the second coil spring 48. The axial distance B1 is, for example, equal to the axial distance B2. FIG. 10 shows a schematic side view of the second coil spring 48.

Since the axial distance B1 as well as the axial distance B2 of the second coil spring 48 is sufficiently large in the flow-rate control valve 12 of the third embodiment, each of the relationships of "P0≥P1≥P2" and "S0≤S1≤S2" is likewise satisfied in the same manner to the first embodiment. In addition, in the flow-rate control valve 12 of the third embodiment, the pressure loss of the vaporized fuel is made smaller and thereby the increase of the electric power consumption is prevented, in the same manner to the first embodiment.

In the second embodiment, it is necessary to assemble the second coil spring 47 in such a way that the first coil portion of the second coil spring 47 is located at the position closer to the valve seat 35. However, in the third embodiment, the second coil spring 48 can be simply assembled to the flow-rate control valve 12 without paying attention to a direction of inserting the second coil spring 48, because the axial distance B1 of the first coil portion and the axial distance B2 of the second coil portion are equal to each other.

Fourth Embodiment

Figure 11:
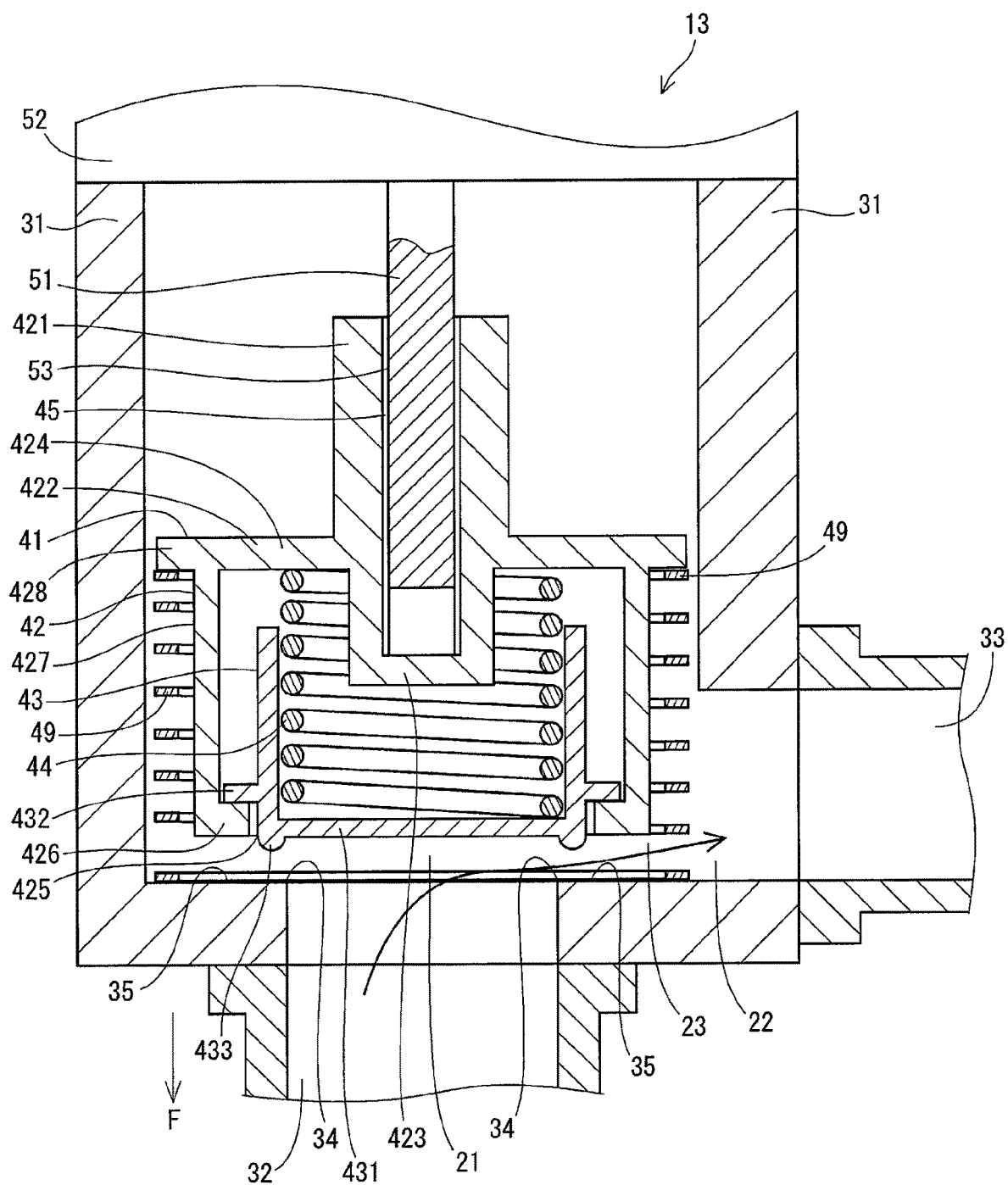
FIG. 11 is a schematic cross-sectional view showing a flow-rate control valve according to a fourth embodiment of the present disclosure.

A flow-rate control valve 13 according to a fourth embodiment, which is used as the flow-rate control valve 6 of FIG. 1, will be explained with reference to FIG. 11. The flow-rate control valve 13 of the fourth embodiment differs from the flow-rate control valve 10 of the first embodiment in a shape of a second coil spring 49. FIG. 11 is a schematic cross-sectional view showing the flow-rate control valve 13 according to the fourth embodiment.

In the second coil spring 49 of the fourth embodiment, a cross section of the spring wire has a rectangular shape, wherein a horizontal dimension (a width in the radial direction perpendicular to the axial direction) is larger than a vertical dimension (a width in the axial direction).

In the fourth embodiment, each of the relationships of "P0≥P1≥P2" and "S0≤S1≤S2" is likewise satisfied in the same manner to the first embodiment. In addition, in the flow-rate control valve 13 of the fourth embodiment, the pressure loss of the vaporized fuel is made smaller and thereby the increase of the electric power consumption is prevented, in the same manner to the first embodiment. It is because the cross section of the spring wire of the second coil spring 49 is formed in the rectangular shape and the vertical dimension is smaller than the horizontal dimension, so that a larger flow passage area can be obtained for the vaporized fuel. Even in a case that a first coil portion of the second coil spring 49 is located in the flow passage area of the vaporized fuel, the pressure loss of the vaporized fuel at such a position can be made smaller.

Further Embodiments and/or Modifications

In the second coil spring 49 for the flow-rate control valve 13 of the fourth embodiment, the shape of the cross section is not limited to the rectangular shape. For example, an oval shape may be applied to the cross section of the second coil spring 49, wherein a vertical diameter is made to be smaller than a horizontal diameter.

The present disclosure is not limited to the above embodiments and/or modifications but can be further modified in various manners without departing from a spirit of the present disclosure.

What is claimed is:

1. A flow-rate control valve comprising:
a valve housing having;
(1a) a first fluid passage connected to a vaporized-fuel inlet port;
(1b) a second fluid passage connected to a vaporized-fuel outlet port;
(1c) a fluid flow path through which fluid flows from the first fluid passage to the second fluid passage; and
(1d) a connecting space formed in the fluid flow path and operatively connecting the first fluid passage to the second fluid passage;
a valve unit movably accommodated in the valve housing in such a manner that the valve unit is operatively brought into contact with a valve seat formed in the valve housing or separated from the valve seat, wherein the valve unit closes the connecting space to prohibit a fluid flow through the connecting space or opens the connecting space to allow the fluid flow therethrough;
a driving portion for driving the valve unit in an axial direction of the valve housing in such a manner that the valve unit is reciprocated between a valve closed position and a valve opened position, wherein the valve unit is brought into contact with the valve seat in the valve closed position and separated from the valve seat in the valve opened position;
a driving-side screw portion formed in the driving portion;
a valve-side screw portion formed in the valve unit and engaged with the driving-side screw portion; and
a coil spring provided in the fluid flow path of the connecting space and biasing the valve unit in the axial direction for absorbing a backlash between the driving-side screw portion and the valve-side screw portion,
wherein pressure losses of the fluid at respective portions are so made as to satisfy a relationship of "P0≥P1≥P2",
"P0" is a pressure loss of the fluid passing through the vaporized-fuel outlet port,
"P1" is a pressure loss of the fluid passing through an axial space formed between the valve unit and the valve seat in the condition that the valve unit is separated from the valve seat, and
"P2" is a pressure loss of the fluid passing through an axial gap formed between neighboring spring wire portions of the coil spring or passing through an axial gap formed between the coil spring and the valve seat.

2. A flow-rate control valve comprising:
a valve housing having;
(1a) a first fluid passage connected to a vaporized-fuel inlet port;
(1b) a second fluid passage connected to a vaporized-fuel outlet port;
(1c) a fluid flow path through which fluid flows from the first fluid passage to the second fluid passage; and
(1d) a connecting space formed in the fluid flow path and operatively connecting the first fuel passage to the second fuel passage;
a valve unit movably accommodated in the valve housing in such a manner that the valve unit is operatively brought into contact with a valve seat formed in the valve housing or separated from the valve seat, wherein the valve unit closes the connecting space to prohibit a fluid flow through the connecting space or opens the connecting space to allow the fluid flow therethrough;
a driving portion for driving the valve unit in an axial direction of the valve housing in such a manner that the valve unit is reciprocated between a valve closed position and a valve opened position, wherein the valve unit is brought into contact with the valve seat in the valve closed position and separated from the valve seat in the valve opened position;
a driving-side screw portion formed in the driving portion;
a valve-side screw portion formed in the valve unit and engaged with the driving-side screw portion; and a coil spring provided in the fluid flow path of the connecting space and biasing the valve unit in the axial direction for absorbing a backlash between the driving-side screw portion and the valve-side screw portion,
wherein cross-sectional areas at respective portions are so made as to satisfy a relationship of "S0≤S1≤S2",
"S0" is a cross-sectional area of the vaporized-fuel outlet port,
"S1" is a cross-sectional area of an axial space formed between the valve unit and the valve seat in the condition that the valve unit is separated from the valve seat, and
"S2" is a total of a cross-sectional area of an axial gap formed between neighboring spring wire portions of the coil spring and a cross-sectional area of an axial gap formed between the coil spring and the valve seat.

3. The flow-rate control valve according to claim 1, wherein
in a first coil portion of the coil spring on a side closer to the valve seat, an axial distance between the neighboring spring wire portions is larger than an axial distance between the valve unit and the valve seat in a condition that the valve unit is separated from the valve seat at its maximum distance.

4. The flow-rate control valve according to claim 3, wherein
in a third coil portion of the coil spring on a side axially opposite to the side closer to the valve seat, an axial distance between the neighboring spring wire portions is larger than the axial distance between the valve unit and the valve seat in the condition that the valve unit is separated from the valve seat at its maximum distance.

5. The flow-rate control valve according to claim 1, wherein
in a cross-sectional shape of a spring wire of the coil spring, a width of the spring wire in a direction perpendicular to the axial direction is larger than a width of the spring wire in the axial direction.

6. The flow-rate control valve according to claim 3, wherein
in a second coil portion of the coil spring connected to the first coil portion, an axial distance between the neighboring spring wire portions is smaller than the axial distance in the first coil portion of the coil spring.

7. The flow-rate control valve according to claim 4, wherein
in a second coil portion of the coil spring between the first coil portion and the third coil portion, an axial distance between the neighboring spring wire portions is smaller than the axial distance in the first coil portion or the third coil portion of the coil spring.

8. The flow-rate control valve according to claim 7, wherein
the axial distance in the first coil portion of the coil spring is equal to the axial distance in the third coil portion of the coil spring.

9. A flow-rate control valve comprising:
a valve housing having:
(1a) a first fluid passage connected to a vaporized-fuel inlet port;
(1b) a second fluid passage connected to a vaporized-fuel outlet port;
(1c) a fluid flow path through which fluid flows from the first fluid passage to the second fluid passage; and
(1d) a connecting space formed in the fluid flow path and operatively connecting the first fluid passage to the second fluid passage;
a valve unit movably accommodated in the valve housing in such a manner that the valve unit is operatively brought into contact with a valve seat formed in the valve housing or separated from the valve seat, wherein the valve unit closes the connecting space to prohibit a fluid flow through the connecting space or opens the connecting space to allow the fluid flow therethrough;
a driving portion for driving the valve unit in an axial direction of the valve housing in such a manner that the valve unit is reciprocated between a valve closed position and a valve opened position, wherein the valve unit is brought into contact with the valve seat in the valve closed position and separated from the valve seat in the valve opened position;
a driving-side screw portion formed in the driving portion;
a valve-side screw portion formed in the valve unit and engaged with the driving-side screw portion; and
a coil spring provided in the fluid flow path of the connecting space and biasing the valve unit in the axial direction for absorbing a backlash between the driving-side screw portion and the valve-side screw portion,
wherein pressure losses of the fluid at respective portions are so made as to satisfy a relationship of "P0≥P1≥P2",
"P0" is a pressure loss of the fluid passing through the vaporized-fuel outlet port,
"P1" is a pressure loss of the fluid passing through an axial space formed between the valve unit and the valve seat in the condition that the valve unit is separated from the valve seat, and
"P2" is a pressure loss of the fluid passing through an axial gap formed between neighboring spring wire portions of the coil spring or passing through an axial gap formed between the coil spring and the valve seat,
wherein cross-sectional areas at respective portions are so made as to satisfy a relationship of "S0≤S1≤S3",
"S0" is a cross-sectional area of the vaporized-fuel outlet port,
"S1" is a cross-sectional area of an axial space formed between the valve unit and the valve seat in the condition that the valve unit is separated from the valve seat, and
"S2" is a total of a cross-sectional area of an axial gap formed between neighboring spring wire portions of the coil spring and a cross-sectional area of an axial gap formed between the coil spring and the valve seat, and
wherein, in a first coil portion of the coil spring on a side closer to the valve seat, an axial distance between the neighboring spring wire portions is larger than an axial distance between the valve unit and the valve seat in a condition that the valve unit is separated from the valve seat at its maximum distance.

10. A flow-rate control valve comprising:
a valve housing having:
(1a) a first fluid passage connected to a vaporized-fuel inlet port;
(1b) a second fluid passage connected to a vaporized-fuel outlet port;
(1c) a fluid flow path through which fluid flows from the first fluid passage to the second fluid passage; and
(1d) a connecting space formed in the fluid flow path and operatively connecting the first fluid passage to the second fluid passage;
a valve unit movably accommodated in the valve housing in such a manner that the valve unit is operatively brought into contact with a valve seat formed in the valve housing or separated from the valve seat, wherein the valve unit closes the connecting space to prohibit a fluid flow through the connecting space or opens the connecting space to allow the fluid flow therethrough;

a driving portion for driving the valve unit in an axial direction of the valve housing in such a manner that the valve unit is reciprocated between a valve closed position and a valve opened position, wherein the valve unit is brought into contact with the valve seat in the valve closed position and separated from the valve seat in the valve opened position;

a driving-side screw portion formed in the driving portion;

a valve-side screw portion formed in the valve unit and engaged with the driving-side screw portion; and a coil spring provided in the fluid flow path of the connecting space and biasing the valve unit in the axial direction for absorbing a backlash between the driving-side screw portion and the valve-side screw portion, wherein pressure losses of the fluid at respective portions are so made as to satisfy a relationship of "$P0 \geq P1 \geq P2$", "$P0$" is a pressure loss of the fluid passing through the vaporized-fuel outlet port, "$P1$" is a pressure loss of the fluid passing through an axial space formed between the valve unit and the valve seat in the condition that the valve unit is separated from the valve seat, and "$P2$" is a pressure loss of the fluid passing through an axial gap formed between neighboring spring wire portions of the coil spring or passing through an axial gap formed between the coil spring and the valve seat, and wherein, in a first coil portion of the coil spring on a side closer to the valve seat, an axial distance between the neighboring spring wire portions is larger than an axial distance between the valve unit and the valve seat in a condition that the valve unit is separated from the valve seat at its maximum distance.

11. A flow-rate control valve comprising:

a valve housing having:

(1a) a first fluid passage connected to a vaporized-fuel inlet port;

(1b) a second fluid passage connected to a vaporized-fuel outlet port;

(1c) a fluid flow path through which fluid flows from the first fluid passage to the second fluid passage; and (1d) a connecting space formed in the fluid flow path and operatively connecting the first fuel passage to the second fuel passage;

a valve unit movably accommodated in the valve housing in such a manner that the valve unit is operatively brought into contact with a valve seat formed in the valve housing or separated from the valve seat, wherein the valve unit closes the connecting space to prohibit a fluid flow through the connecting space or opens the connecting space to allow the fluid flow therethrough;

a driving portion for driving the valve unit in an axial direction of the valve housing in such a manner that the valve unit is reciprocated between a valve closed position and a valve opened position, wherein the valve unit is brought into contact with the valve seat in the valve closed position and separated from the valve seat in the valve opened position;

a driving-side screw portion formed in the driving portion;

a valve-side screw portion formed in the valve unit and engaged with the driving-side screw portion; and a coil spring provided in the fluid flow path of the connecting space and biasing the valve unit in the axial direction for absorbing a backlash between the driving-side screw portion and the valve-side screw portion, wherein cross-sectional areas at respective portions are so made as to satisfy a relationship of "$S0 \leq S1 \leq S2$", "$S0$" is a cross-sectional area of the vaporized-fuel outlet port, "$S1$" is a cross-sectional area of an axial space formed between the valve unit and the valve seat in the condition that the valve unit is separated from the valve seat, and "$S2$" is a total of a cross-sectional area of an axial gap formed between neighboring spring wire portions of the coil spring and a cross-sectional area of an axial gap formed between the coil spring and the valve seat, and wherein, in a first coil portion of the coil spring on a side closer to the valve seat, an axial distance between the neighboring spring wire portions is larger than an axial distance between the valve unit and the valve seat in a condition that the valve unit is separated from the valve seat at its maximum distance.

* * * * *